US012698213B2

(12) United States Patent
Yoshida et al.

(10) Patent No.: US 12,698,213 B2
(45) Date of Patent: Aug. 4, 2026

(54) POWDER INCLUDING NIOBIUM COMPLEX AND LITHIUM AND PRODUCTION METHOD THEREOF, AND PRODUCTION METHOD OF LITHIUM SECONDARY BATTERY POSITIVE ELECTRODE ACTIVE MATERIAL HAVING COATED LAYER CONTAINING LITHIUM NIOBATE

(71) Applicant: DOWA ELECTRONICS MATERIALS CO., LTD., Tokyo (JP)

(72) Inventors: Masahiro Yoshida, Tokyo (JP); Hidefumi Fujita, Tokyo (JP); Koji Tanque, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 445 days.

(21) Appl. No.: 18/278,436

(22) PCT Filed: Mar. 17, 2022

(86) PCT No.: PCT/JP2022/012481
§ 371 (c)(1),
(2) Date: Aug. 23, 2023

(87) PCT Pub. No.: WO2022/230437
PCT Pub. Date: Nov. 3, 2022

(65) Prior Publication Data
US 2024/0132368 A1     Apr. 25, 2024
US 2024/0228316 A9     Jul. 11, 2024

(30) Foreign Application Priority Data

Apr. 28, 2021     (JP) .................................. 2021-076537

(51) Int. Cl.
*C01G 33/00*          (2006.01)
(52) U.S. Cl.
CPC .......... *C01G 33/00* (2013.01); *C01P 2004/60* (2013.01); *C01P 2004/82* (2013.01); *C01P 2006/40* (2013.01); *C01P 2006/80* (2013.01)
(58) Field of Classification Search
CPC ..... C01G 33/00; C01G 33/003; C01G 33/006
See application file for complete search history.

(56) References Cited

U.S. PATENT DOCUMENTS

2016/0043391 A1*  2/2016  Nagatomi .............. C01G 51/42
                                                                    427/126.3
2017/0077489 A1*  3/2017  Uchiyama .............. C01G 53/50
2020/0075956 A1*  3/2020  Sugiura ................. C01G 33/00

FOREIGN PATENT DOCUMENTS

| | | |
|---|---|---|
| JP | 62-260860 | 11/1987 |
| JP | 01-093425 | 4/1989 |
| JP | 04-265227 | 9/1992 |
| JP | 2014-210701 | 11/2014 |
| JP | 2020-035607 | 3/2020 |
| JP | 2020-066570 | 4/2020 |
| JP | 2020-164401 | 10/2020 |

OTHER PUBLICATIONS

Park et al., "Heterometallic lithium niobium complexes: synthesis and molecular structures of LiNbO(O—2,6—PhMe2)4. 3THF and [LiNbCl3(O—2,6—PhMe2)2 • 2THF]2," Polyhedron 19 (2000) (1037-1041) (Year: 2000).*
Dey, D. et al., "A Softer and Efficient Route for the Synthesis of Lithium Niobate Powder", Transactions of the Materials Research Society of Japan, Jun. 2003, vol. 28, No. 2, pp. 341-344.
Wang, L. H. et al., "Synthesis and characterization of fine lithium niobate powders by sol-gel method", Crystal research & Technology, Mar. 8, 2007, vol. 42, pp. 321-324.
Hou, Y. et al., "The atomic level journey from aqueous polyoxometalate to metal oxide", Journal of Solid State Chemistry, vol. 221, Jan. 2015, pp. 418-425.
Camargo, E. R., et al., "Low temperature synthesis of lithium niobate powders based on water-soluble niobium malato complexes", Solid State Ionics, Sep. 11, 2002, vol. 151, pp. 413-418.
Camargo, E. R. eta 1., Chemical synthesis of lithium niobate powders (LiNb03) prepared from water-soluble DL-malic acid complexes, Chemistry of Materials, May 4, 2001, vol. 13, pp. 1905-1909.

* cited by examiner

*Primary Examiner* — Amanda J Barrow
(74) *Attorney, Agent, or Firm* — Millen, White, Zelano & Branigan, P.C.; Christopher W. Brody

(57)          ABSTRACT

A powder contains a niobium complex and lithium, an amount of niobium being 25 mass % or more and 75 mass % or less, a proportion of niobium in metal elements of the powder is 0.775 or more and 0.950 or less in terms of mass ratio. When the powder is dissolved in 8 times its mass of water at 25° C., a niobium content contained in a filtrate thereof is 80 mass % or more of an amount of niobium contained in the powder before dissolution. The powder is obtained by mixing a niobium compound, a lithium compound, an alkali, hydrogen peroxide, and water to obtain an aqueous solution containing a niobium complex and lithium and then drying the solution at a temperature equal to or lower than a decomposition temperature of the niobium complex. The powder is suitable for preparing a lithium niobate precursor solution for coating positive electrode active material particles.

12 Claims, No Drawings

POWDER INCLUDING NIOBIUM COMPLEX AND LITHIUM AND PRODUCTION METHOD THEREOF, AND PRODUCTION METHOD OF LITHIUM SECONDARY BATTERY POSITIVE ELECTRODE ACTIVE MATERIAL HAVING COATED LAYER CONTAINING LITHIUM NIOBATE

TECHNICAL FIELD

The present invention relates to a powder containing a niobium complex and lithium suitable for preparing an aqueous solution for coating surfaces of positive electrode active material particles of a lithium ion secondary battery with lithium niobate, which is a solid electrolyte, by a wet method, and a production method thereof, and a production method of a lithium secondary battery positive electrode active material having a coating layer containing lithium niobate.

BACKGROUND ART

A positive electrode active material of a lithium ion secondary battery has conventionally generally been formed of a composite oxide of lithium and a transition metal. In particular, lithium cobaltate ($LiCoO_2$), which is a composite oxide containing Co as a component, is heavily used. In addition, recently, the use of lithium nickelate ($LiNiO_2$), lithium manganate ($LiMn_2O_4$), or a ternary system ($LiNi_{1/3}Mn_{1/3}Co_{1/3}O_2$ or the like), or a composite type thereof has been also increasing.

As an electrolytic solution of a lithium ion secondary battery, one obtained by dissolving a lithium salt such as an electrolyte $LiPF_6$ or $LiBF_4$ in a mixed solvent of a cyclic carbonate such as PC (propylene carbonate) or EC (ethylene carbonate) and a chain ester such as DMC (dimethyl carbonate), EMC (ethyl methyl carbonate), or DEC (diethyl carbonate) is mainly used. Such an organic solvent is weak against an oxidizing atmosphere, and is likely to cause an oxidative decomposition reaction when it comes into contact with a transition metal such as Co, Ni, or Mn particularly on the surface of the positive electrode. A possible factor for this is that the surface of the positive electrode is at a high potential, the transition metal in a highly oxidized state acts catalytically, or the like. Therefore, it is effective for maintaining the performance of the electrolytic solution to prevent contact between the electrolytic solution and the transition metal (for example, one or more of Co, Ni, and Mn) that forms the positive electrode active material as much as possible.

Further, as a method for fundamentally solving the problem of the organic solvent-based electrolytic solution, an all-solid-state lithium ion secondary battery in which the electrolytic solution is replaced with a nonflammable solid electrolyte has been proposed.

In general, an electrode reaction in a battery occurs at an interface between an electrode active material and an electrolytic solution. Here, when a liquid electrolytic solution is used as the electrolytic solution, the electrolytic solution permeates the surface of the electrode active material present on the electrode, and a reaction interface for charge transfer is formed. In the case of an all-solid-state battery, a solid electrolyte with ionic conductivity plays a role of an electrolytic solution, however, the solid electrolyte itself does not have fluidity like a liquid, and therefore, it is necessary to mix a powder to become the electrode active material with the solid electrolyte before forming a secondary battery, or to coat a powder to become the electrode active material with the solid electrolyte to form a composite in advance.

However, in the case of the all-solid-state lithium ion secondary battery, there is a problem that the resistance generated when lithium ions move across the interface between the positive electrode active material and the solid electrolyte (hereinafter sometimes referred to as "interface resistance") increases, and the performance such as battery capacity of the all-solid-state lithium ion secondary battery tends to decrease. The increase in interface resistance is believed to be caused by a reaction between the positive electrode active material and the solid electrolyte to form a high resistance part on the surface of the positive electrode active material, and it is known that the interface resistance can be reduced by coating the surface of lithium cobaltate, which is the positive electrode active material, with lithium niobate. Various methods can be used for a method for coating with lithium niobate, and for example, PTLs 1 to 4 propose a treatment liquid for forming a lithium niobate coating layer on the surface of lithium cobaltate, which is a positive electrode active material, using a wet method.

CITATION LIST

Patent Literature

PTL 1: JP2014-210701A
PTL 2: JP2020-066570A
PTL 3: JP2020-164401A
PTL 4: JP2020-035607A

SUMMARY OF INVENTION

Technical Problem

PTL 1 discloses an aqueous solution containing lithium and a niobium complex and having a pH value of 8.0 or more and 10.5 or less, and a production method thereof. PTL 2 discloses a lithium niobate precursor solution containing polyoxometalate ions of niobium, Li ions, and hydrogen peroxide, and a production method thereof. Further, PTL 3 discloses a solution containing lithium, a niobium complex, and nitrous acid, a production method thereof, and a production method of an active material for a lithium secondary battery using the solution. The aqueous solutions disclosed in these patent documents are all to become a precursor of lithium niobate, and each patent document mentions storage stability of the aqueous solution as a problem to be solved. However, according to the studies of the present inventors, none of the precursor solutions described in PTLs 1 to 3 are necessarily satisfactory in terms of storage stability. In addition, the precursor aqueous solutions have problems that the ratio of the mass of the solvent to the total mass is large, and the transport cost is high.

Therefore, it is conceivable to dry and solidify a lithium niobate precursor solution containing niobium and lithium, store it in a solid state, and dissolve it in water to form an aqueous solution at the time of use. However, the powder containing niobium and lithium produced by the prior art has a problem that the water solubility is low. In particular, since the dissolution ratio of niobium in water is low, a highly water-soluble powder containing niobium and lithium has not been obtained.

For example, PTL 4 discloses a technique for obtaining lithium niobate by heating a lithium niobate precursor obtained by drying a solution containing niobium ions and lithium ions at a temperature of 250° C. to 300° C. However, lithium niobate obtained by heating under such a temperature condition is sparingly soluble in water.

In view of the above problems, an object of the invention is to provide a powder containing a niobium complex and lithium and having a high solubility in water, the powder being suitable for preparing a lithium niobate precursor solution for coating surfaces of positive electrode active material particles of a lithium ion secondary battery with lithium niobate which is a solid electrolyte, and a production method thereof.

Note that the "niobium complex contained in the powder" as used herein refers to a material in which niobium is solidified while remaining in a state of being coordinately bonded to a ligand (complexing agent). Therefore, in the present description, the term of niobium complex is used to mean both a complex formed in an aqueous solution and a material obtained by solidifying it, but the difference can be clearly read from the context.

Solution to Problem

In order to achieve the above object, the invention provides

[1] a powder containing a niobium complex and lithium, wherein the powder contains niobium in an amount of 25 mass % or more and 75 mass % or less, a proportion of niobium in metal elements contained in the powder is 0.775 or more and 0.950 or less in terms of mass ratio, and a niobium dissolution ratio of the powder containing a niobium complex and lithium defined by the following formula (1) is 80% or more.

$$\text{Niobium dissolution ratio (\%)} = \text{Nb}_w \times 100 / \text{Nb}_{HF} \qquad (1)$$

Here, $\text{Nb}_w$ and $\text{Nb}_{HF}$ are a mass of niobium calculated by the following procedure.

The powder containing a niobium complex and lithium is weighed, and the weighed powder is dissolved in 8 times its mass of water at 25° C., and then, a resultant is filtered through a membrane filter with an opening of 0.20 μm, and a concentration of niobium in an obtained filtrate is measured with an inductively coupled plasma atomic emission spectrometer (ICP-AES). A mass of niobium eluted into the filtrate from per unit mass of the weighed powder calculated from the concentration of niobium in the obtained filtrate and a mass of the filtrate is defined as $\text{Nb}_w$.

The powder containing a niobium complex and lithium is weighed, and to the weighed powder, hydrofluoric acid is added to dissolve the powder, and after cooling, a concentration of niobium in an obtained solution is measured with an inductively coupled plasma atomic emission spectrometer (ICP-AES). A mass of niobium contained per unit mass of the weighed powder calculated from the concentration of niobium in the obtained solution and a volume of the solution is defined as $\text{Nb}_{HF}$.

[2] It is preferred that in the powder containing a niobium complex and lithium according to the above item [1], a content of niobium is 40 mass % or more and 50 mass % or less.

[3] It is preferred that in the powder containing a niobium complex and lithium according to the above item [1] or [2], lithium is contained in an amount of 2.5 mass % or more and 6.0 mass % or less, a total proportion of niobium and lithium in the metal elements contained in the powder is 0.80 or more and 1.00 or less in terms of mass ratio, and a Li/Nb molar ratio is 0.7 or more and 1.5 or less.

[4] It is preferred that in the powder containing a niobium complex and lithium according to the above items [1] to [3], a content of lithium is 3.0 mass % or more and 4.5 mass % or less.

[5] It is preferred that in the powder containing a niobium complex and lithium according to the above items [1] to [4], a lithium dissolution ratio of the powder containing a niobium complex and lithium defined by the following formula (2) is 80% or more.

Here, $\text{Li}_w$ and $\text{Li}_{HF}$ are a mass of lithium calculated by the following procedure.

The powder containing a niobium complex and lithium is weighed, and the weighed powder is dissolved in 8 times its mass of water at 25° C., and then, a resultant is filtered through a membrane filter with an opening of 0.20 μm, and a concentration of lithium in an obtained filtrate is measured with an inductively coupled plasma atomic emission spectrometer (ICP-AES). A mass of lithium eluted into the filtrate from per unit mass of the weighed powder calculated from the concentration of lithium in the obtained filtrate and a mass of the filtrate is defined as $\text{Li}_w$.

The powder containing a niobium complex and lithium is weighed, and to the weighed powder, hydrofluoric acid is added to dissolve the powder, and after cooling, a concentration of lithium in an obtained solution is measured with an inductively coupled plasma atomic emission spectrometer (ICP-AES). A mass of lithium contained per unit mass of the weighed powder calculated from the concentration of lithium in the obtained solution and a volume of the solution is defined as $\text{Li}_{HF}$.

[6] It is preferred that the powder containing a niobium complex and lithium according to the above items [1] to [5] contains oxygen, and a total content of niobium, lithium, and oxygen is 85 mass % or more.

[7] It is preferred that a content of ammonium ions contained in a filtrate obtained by dissolving the powder containing a niobium complex and lithium according to the above items [1] to [6] in 8 times its mass of water at 25° C., and then, filtering a resultant through a membrane filter with an opening of 0.20 μm is 0.5 mass % or less.

[8] It is preferred that an absorbance at a wavelength of 660 nm of a filtrate obtained by dissolving the powder containing a niobium complex and lithium according to the above items [1] to [7] in 8 times its mass of water at 25° C., and then, filtering a resultant through a membrane filter with an opening of 0.20 μm is 1.0 or less.

[9] It is preferred that in the powder containing a niobium complex and lithium according to the above items [1] to [8], a volume-based cumulative 50% particle diameter $D_{50}$ is 1 mm or less.

The invention further provides

[10] a production method of a powder containing a niobium complex and lithium, including a step of mixing a niobium compound, a lithium compound, an alkali, hydrogen peroxide, and water, thereby obtaining an aqueous solution containing a niobium complex and lithium, and a step of drying the aqueous solution containing a niobium complex and lithium at a temperature equal to or lower than a decomposition temperature of the niobium complex.

[11] It is preferred that in the production method of a powder containing a niobium complex and lithium according to the above item [10], a pressure during drying of the aqueous solution is equal to or lower than a saturated vapor pressure of water at a drying temperature for the aqueous solution.

The invention further provides

[12] a production method of a lithium secondary battery positive electrode active material having a coating layer containing lithium niobate, including a step of dissolving a powder containing a niobium complex and lithium obtained by the production method of a powder containing a niobium complex and lithium according to the above item [10] or [11] in water, thereby obtaining an aqueous solution containing the niobium complex and lithium, a step of coating a surface of a lithium secondary battery positive electrode active material with the aqueous solution containing the niobium complex and lithium, and a step of subjecting the lithium secondary battery positive electrode active material coated with the aqueous solution containing the niobium complex and lithium to a heat treatment.

Advantageous Effects of Invention

A lithium niobate precursor solution is easily obtained by dissolving a powder containing a niobium complex and lithium obtained by the production method of the invention in water. A high resistance layer is not formed on a lithium niobate coating layer formed on a surface of a positive electrode active material for a lithium ion secondary battery using the precursor solution. Therefore, the invention can contribute to improving the performance of an all-solid-state lithium ion secondary battery.

DESCRIPTION OF EMBODIMENTS

[Positive Electrode Active Material]

Examples of the positive electrode active material to be coated with the lithium niobate precursor solution prepared from the powder containing a niobium complex and lithium of the invention include the following materials. The positive electrode active material is a material formed of a composite oxide of Li and a transition metal M, and materials which are conventionally used for a lithium ion secondary battery, for example, lithium cobalt oxides ($Li_{1+x}CoO_2$, $-0.1 \leq X \leq 0.3$), lithium transition metal oxides such as $Li_{1+x}NiO_2$, $Li_{1+x}Mn_2O_4$, $Li_{1+x}Ni_{1/2}Mn_{1/2}O_2$, $Li_{1+x}Ni_{1/3}Co_{1/3}Mn_{1/3}O_2$ (all $-0.1 \leq X \leq 0.3$), and $Li_{1+x}[Ni_YLi_{1/3-2Y/3}Mn_{2/3-Y/3}]O_2$ ($0 \leq X \leq 1$, $0 < Y < \frac{1}{2}$), or those obtained by partially substituting Li or a transition metal element thereof with Al or another element, phosphates having an olivine structure such as $Li_{1+x}FePO_4$ and $Li_{1+x}MnPO_4$ (both $-0.1 \leq X \leq 0.3$), and the like are exemplified.

[Powder Containing Niobium Complex and Lithium]

The invention provides a powder containing a niobium complex and lithium for preparing a lithium niobate precursor solution. The powder contains niobium and lithium as metal elements and unavoidable impurities resulting from the production step. It is preferred that the content of niobium in the powder is 25 mass % or more and 75 mass % or less.

The content of niobium in the lithium niobate precursor solution is set according to the design of the battery unit such as the positive electrode active material. However, as the powder, the higher the content of niobium is, the easier the adjustment of the concentration by the subsequent dilution through dissolution in water or the like is and the more the adjustment range expands. Therefore, the content of niobium in the powder is preferably 25 mass % or more, and more preferably 40 mass % or more. In addition, since the powder contains lithium, oxygen, a complexing agent component, and the like as constituent components, the upper limit of the content of niobium in the powder does not exceed 75 mass %. The content of niobium in the powder is more preferably 50 mass % or less.

It is preferred that the proportion of niobium in the metal elements in the powder is 0.775 or more and 0.950 or less in terms of mass ratio. When the proportion of niobium in the metal elements is less than 0.775, the proportion of lithium becomes excessive, or the content of metal elements other than niobium and lithium increases. In the case where the proportion of lithium becomes excessive, when the lithium niobate precursor solution is prepared using the powder and a coating layer is formed on the positive electrode active material, a component that does not have lithium ion conductivity such as lithium hydroxide is generated, and the battery performance deteriorates, which is not preferred. Also in the case where the content of metal elements other than niobium and lithium increases, when the lithium niobate precursor solution is prepared using the powder and a coating layer is formed on the positive electrode active material, a component that does not have lithium ion conductivity is generated, and the battery performance deteriorates, which is not preferred. Further, when the proportion of niobium in the metal elements exceeds 0.950, the below-mentioned Li/Nb molar ratio becomes less than 0.7, which is not preferred.

It is preferred that niobium contained in the powder forms a complex. By forming a complex, the dissolution ratio of niobium in water is improved. Whether the niobium complex is formed is confirmed by Fourier transform infrared spectroscopy (FT-IR) based on the presence of an absorption peak at $845 \pm 20$ cm$^{-1}$ derived from the complex.

The content of niobium in the powder will be described later.

[Water Solubility]

As described above, the powder containing a niobium complex and lithium obtained by the invention has a high dissolution ratio in water, that is, has high water solubility. In particular, the powder has a high dissolution ratio of niobium whose dissolution ratio in water is low. In the present description, the water solubility is evaluated by the niobium dissolution ratio of the powder containing a niobium complex and lithium defined by the following formula (1).

$$\text{Niobium dissolution ratio (\%)} = Nb_w \times 100/Nb_{HF} \qquad (1)$$

Here, $Nb_w$ and $Nb_{HF}$ are a mass of niobium calculated by the following procedure.

The powder containing a niobium complex and lithium is weighed, and the weighed powder is dissolved in 8 times its mass of water at 25° C., and then, the resultant is filtered through a membrane filter with an opening of 0.20 μm, and the concentration of niobium in the obtained filtrate is measured with an inductively coupled plasma atomic emission spectrometer (ICP-AES). The mass of niobium eluted into the filtrate from per unit mass of the weighed powder calculated from the concentration of niobium in the obtained filtrate and the mass of the filtrate is defined as $Nb_w$.

The powder containing a niobium complex and lithium is weighed, and to the weighed powder, hydrofluoric acid is added to dissolve the powder, and after cooling, the concentration of niobium in the obtained solution is measured with an inductively coupled plasma atomic emission spectrometer (ICP-AES). The mass of niobium contained per unit mass of the weighed powder calculated from the concentration of niobium in the obtained solution and the volume of the solution is defined as $Nb_{HF}$.

The niobium dissolution ratio ($Nb_w \times 100/Nb_{HF}$) is calculated from these two values and used as an index of the water solubility of the powder containing a niobium complex and lithium.

In the powder containing a niobium complex and lithium of the invention, the niobium dissolution ratio defined by the above formula (1) is 80% or more. When the niobium dissolution ratio is less than 80%, in the lithium niobate precursor solution to be prepared, an insoluble solid containing niobium will be contained. When the above-mentioned solid is mixed in the lithium niobate coating layer to be finally formed on the surface of the positive electrode active material, the layer thickness of the coating layer becomes uneven, and the formation of a high resistance part proceeds from a thin film portion, so that the battery performance may deteriorate, which is not preferred.

The powder containing a niobium complex and lithium of the invention is finally used for forming the lithium niobate coating layer on the surface of the positive electrode active material, and therefore, the addition amounts of lithium and niobium need to be approximately equimolar.

The powder containing a niobium complex and lithium of the invention preferably contains lithium in an amount of 2.5 mass % or more and 6.0 mass % or less, and more preferably 3.0 mass % or more and 4.5 mass % or less. When the content of lithium in the powder is less than 2.5 mass %, the proportion of an unnecessary component as a raw material of the lithium niobate precursor solution in the mass increases, and the transport cost increases, which is not preferred. Further, the powder contains niobium, oxygen, a complexing agent component, and the like as the constituent components, and therefore, the upper limit of the content of lithium in the powder does not exceed 6.0 mass %.

Further, it is preferred that the total proportion of niobium and lithium in the metal elements contained in the powder is 0.80 or more and 1.00 or less in terms of mass ratio. When the total proportion of niobium and lithium in the powder is less than 0.80, the proportion of an unnecessary component as a raw material of the lithium niobate precursor solution in the mass increases, and the transport cost increases, which is not preferred. It is preferred that the molar ratio of niobium and lithium Li/Nb is set to 0.7 or more and 1.5 or less. When Li/Nb is less than 0.7, lithium niobate represented by $LiNbO_3$ is deficient in lithium, and therefore, the lithium ion conductivity in the finally formed lithium niobate coating film deteriorates, which is not preferred. On the other hand, when Li/Nb exceeds 1.5, the pH increases due to excess lithium hydroxide at the time of preparation of the precursor solution, and therefore, the storage stability of the liquid deteriorates, which is not preferred.

Note that the contents of niobium and lithium can be measured by a method according to [Measurement of Contents of Niobium and Lithium] described later.

The water solubility of the powder containing a niobium complex and lithium of the invention can also be defined by the lithium dissolution ratio of the powder containing a niobium complex and lithium defined by the following formula (2). In the powder containing a niobium complex and lithium of the invention, it is preferred that the lithium dissolution ratio is 80% or more.

$$\text{Lithium dissolution ratio } (\%) = Li_w \times 100/Li_{HF} \qquad (2)$$

Here, $Li_w$ and $Li_{HF}$ are a mass of lithium calculated by the following procedure.

The powder containing a niobium complex and lithium is weighed, and the weighed powder is dissolved in 8 times its mass of water at 25° C., and then, the resultant is filtered through a membrane filter with an opening of 0.20 μm, and the concentration of lithium in the obtained filtrate is measured with an inductively coupled plasma atomic emission spectrometer (ICP-AES). The mass of lithium eluted into the filtrate from per unit mass of the weighed powder calculated from the concentration of lithium in the obtained filtrate and the mass of the filtrate is defined as $Li_w$.

The powder containing a niobium complex and lithium is weighed, and to the weighed powder, hydrofluoric acid is added to dissolve the powder, and after cooling, the concentration of lithium in the obtained solution is measured with an inductively coupled plasma atomic emission spectrometer (ICP-AES). The mass of lithium contained per unit mass of the weighed powder calculated from the concentration of lithium in the obtained solution and the volume of the solution is defined as $Li_{HF}$.

When the lithium dissolution ratio is less than 80%, in the lithium niobate precursor solution to be prepared, an insoluble solid containing niobium or lithium will be contained. When the above-mentioned solid is mixed in the lithium niobate coating layer to be finally formed on the surface of the positive electrode active material, the layer thickness of the coating layer becomes uneven, and the formation of a high resistance part proceeds from a thin film portion, so that the battery performance may deteriorate, which is not preferred.

It is preferred that the powder containing a niobium complex and lithium of the invention contains oxygen in addition to niobium and lithium, and the total content of niobium, lithium, and oxygen is 85 mass % or more. The powder also contains hydrogen derived from hydrogen peroxide and other, but the mass of hydrogen is negligibly small, and therefore, the upper limit of the total content of niobium, lithium, and oxygen can be close to 100 mass %. Note that as the content of oxygen in the powder containing a niobium complex and lithium, the value of the concentration of oxygen (mass %) measured using an oxygen/nitrogen analyzer is used for the concentration of oxygen described in [Measurement of Contents of Carbon and Oxygen] in Examples below.

It is preferred that in the powder containing a niobium complex and lithium of the invention, the content of carbon is 0.5 mass % or less. When the content of carbon is more than 0.5 mass %, the possibility of generation of lithium carbonate when finally forming the lithium niobate coating layer on the surface of the positive electrode active material increases. Since lithium carbonate does not have lithium ion conductivity, the battery performance may deteriorate, which is not preferred. Note that the concentration of carbon in a dry powder sample is measured using a trace carbon/sulfur analyzer described in [Measurement of Contents of Carbon and Oxygen] in Examples below.

In addition, it is preferred that the content of ammonium ions contained in a filtrate obtained by dissolving the powder containing a niobium complex and lithium of the invention in 8 times its mass of water at 25° C., and then, filtering the resultant through a membrane filter with an opening of 0.20 μm is 0.5 mass % or less. When the content of ammonium ions in the filtrate is 0.5 mass % or less, the powder containing a niobium complex and lithium is dissolved in water, and the niobium complex in the lithium niobate precursor solution, which is an aqueous solution containing the niobium complex and lithium, is stabilized, and it is possible to suppress the decomposition of the niobium complex and the deposition of a water-insoluble solid, which is preferred. Note that the content of ammonium ions in a filtrate solution is measured using an ion chromatograph described in [Measurement of Amount of Ammonium Ions in Filtrate] in Examples below.

After the powder containing a niobium complex and lithium of the invention is dissolved in 8 times its mass of water at 25° C., the resultant is filtered through a membrane filter with an opening of 0.20 µm, and in the obtained filtrate, insoluble fine particles that have passed through the membrane filter with an opening of 0.20 µm are present, and the abundance of the fine particles can be qualitatively evaluated based on the absorbance at a wavelength of 660 nm. It is preferred that the absorbance at a wavelength of 660 nm of a filtrate obtained by dissolving the powder containing a niobium complex and lithium of the invention in 8 times its mass of water at 25° C., and then, filtering the resultant through a membrane filter with an opening of 0.20 µm is 1.0 or less. Note that the insoluble fine particles that have passed through the membrane filter are included in the dissolution amount defined by water solubility.

Further, it is preferred that the powder containing a niobium complex and lithium of the invention has a volume-based cumulative 50% particle diameter $D_{50}$ after pulverization of 1 mm or less. When $D_{50}$ exceeds 1 mm, the solubility in water becomes low, and the possibility that an undissolved powder is contained as a solid in the lithium niobate precursor solution to be prepared increases, which is not preferred. A preferred lower limit of $D_{50}$ is not particularly limited, but usually one having a $D_{50}$ of about 10 µm or more is obtained. Therefore, $D_{50}$ is preferably in a range of 10 µm or more and 1 mm or less. Note that $D_{50}$ is measured using a laser diffraction scattering particle size distribution analyzer.

The dry powder sample obtained by drying the powder containing a niobium complex and lithium described above contains moisture. The amount of the moisture can be measured by a coulometric titration method based on the Karl Fischer method, and is usually 20 mass % or less. In addition, the moisture is considered to be not adhering water, but water of crystallization based on the results of TG-DTA measurement.

It is preferred that the powder containing a niobium complex and lithium of the invention is a powder containing a substance having an amorphous structure in the powder. Here, the "powder containing a substance having an amorphous structure" means that the powder containing a niobium complex and lithium does not have a definite crystal structure. When the powder containing a niobium complex and lithium contains water as a constituent component, the powder tends to become amorphous. When the powder contains a substance having an amorphous structure, the solubility in water increases, and the possibility that an undissolved powder is contained as a solid in the lithium niobate precursor solution to be prepared decreases, which is preferred. Note that the powder containing a niobium complex and lithium of the invention need not be entirely amorphous, and may partially have an amorphous structure.

Whether the powder containing a niobium complex and lithium contains a substance having an amorphous structure can be determined by whether a halo pattern is observed in a region of 2θ: 20° to 60° (when an X-ray tube used in the measurement is a Cu tube) in a diffraction pattern obtained by X-ray diffractometry. Note that the "halo" here refers to a pattern which does not show a clear peak in a diffraction pattern and is observed as a broad rise. In the invention, a broad rise having a half width 2θ of 2° or more is defined as "halo".

[Production Method of Powder Containing Niobium Complex and Lithium]

[Raw Material Solution]

In the production method of a powder containing a niobium complex and lithium of the invention, a niobium compound, a lithium compound, hydrogen peroxide which is a complexing agent (ligand) for solubilizing a niobium complex in an aqueous solution, and an alkali are mixed in water, whereby a raw material solution (starting material) which is an aqueous solution containing a niobium complex and lithium is obtained.

The ligand for the niobium complex described above is not particularly limited as long as the niobium complex is made water-soluble, and in the present Example, hydrogen peroxide is used as the ligand, and a peroxo complex of niobic acid $[Nb(O_2)_4]^{3-}$) is formed. The peroxo complex of niobic acid does not contain carbon in the chemical structure, and therefore, carbon does not remain in the lithium niobate coating film to be finally formed, and it is particularly suitable in the production method of a powder containing a niobium complex and lithium of the invention.

The peroxo complex of niobic acid can be obtained, for example, by the following method.

Hydrous niobium oxide ($Nb_2O_5 \cdot nH_2O$) is added to a hydrogen peroxide aqueous solution and mixed. In the mixing, niobic acid is not dissolved in the hydrogen peroxide aqueous solution, but a milky suspension solution can be obtained.

To the suspension of the peroxo complex of niobic acid, an alkali such as ammonia water is added and mixed, whereby a transparent peroxo complex of niobic acid can be obtained.

As will be described later, the amount of the alkali to be added to the suspension may be set so that the finally obtained solution containing a niobium complex and lithium has a pH value of 8.0 or more and 11.5 or less.

Further, when ammonia water is added as the alkali to the suspension, the addition amount of ammonia water may be determined in consideration of volatilization of ammonia during the reaction.

In addition, it is also possible to add an alkaline solution in place of the ammonia water. It is also possible to select and add a lithium hydroxide aqueous solution as the alkaline solution.

[Niobium Compound]

Anhydrous niobium oxide ($Nb_2O_5$) is sparingly soluble in water, and therefore, in the production method of the invention, hydrous niobium oxide which is amorphous and soluble in water is used as the Nb source. Hydrous niobium oxide is a substance represented by the general formula $Nb_2O_5 \cdot nH_2O$ (where n is not 0 but is, for example, 3≤n≤16).

The concentration of niobium in the raw material solution is not particularly defined in the invention, but is preferably 0.1 mol/L to 10.0 mol/L with respect to niobium from the viewpoint of manufacturability.

[Lithium Compound]

In the production method of the invention, lithium hydroxide (LiOH) is used as the Li compound. LiOH may be either anhydrous or hydrated. LiOH added to the aqueous solution dissociates into $Li^+$ and $OH^-$ and exhibits strong alkalinity. Since LiOH itself is a strong alkali, when LiOH is added to an aqueous solution containing niobic acid, the pH of the system rises and niobium oxide dissolves. Thereafter, hydrogen peroxide is added to the alkaline aqueous solution containing niobium and Li ions to form a peroxo complex of niobium.

As for the addition amount of Li to the raw material solution, Li is added so that the Li/Nb molar ratio is 0.7 or more and 1.5 or less. The reason for this is described above.

[Hydrogen Peroxide]

In the production method of a powder containing a niobium complex and lithium of the invention, in order to ensure the water solubility of the powder and to ensure the stability when the powder is dissolved in water, hydrogen peroxide is added to the raw material solution to complex niobium, whereby a peroxo complex is formed. The concentration of hydrogen peroxide to be added is preferably 2 mol or more and 25 mol or less with respect to 1 mol of niobium. The concentration is more preferably 4 mol or more and 20 mol or less. When the concentration of hydrogen peroxide is less than 3 mol with respect to 1 mol of niobium, niobium cannot form a peroxo complex, which is not preferred. In addition, when it exceeds 25 mol, unreacted hydrogen peroxide remains in the raw material solution and the stability of the niobium complex deteriorates, which is not preferred.

[pH]

As described above, LiOH is a strong alkali, and therefore, the raw material solution becomes alkaline. The pH of the raw material solution is preferably 8.0 to 11.5 in order to prevent destabilization of the niobium complex. In addition to LiOH, an alkali may be further added in order to adjust the pH of the raw material solution within that range. In that case, it is preferred to add ammonia water or ammonium carbonate, which is less likely to remain as an impurity in the powder containing a niobium complex and lithium. Here, the pH value is a value measured using a glass electrode with a pH meter equipped with a temperature compensating electrode, calibrated using an appropriate buffer solution according to the pH range to be measured based on JIS Z 8802.

Note that when the powder containing a niobium complex and lithium obtained by the production method of the invention is dissolved in 8 times its mass of water at 25° C., it is preferred that the content of ammonium ions contained in the filtrate thereof is 0.5 mass % or less.

[Drying Step]

In the production method of a powder containing a niobium complex and lithium of the invention, the raw material solution prepared under the above conditions is dried at a temperature equal to or lower than the decomposition temperature of the niobium complex, thereby obtaining the powder. As for the decomposition temperature of the niobium complex, a preliminary experiment is performed by a thermogravimetry-differential thermal analysis (TG-DTA) for each adjustment condition of the raw material solution, the temperature of the endothermic peak is detected, and the temperature is defined as the decomposition temperature.

When drying is performed at a temperature equal to or lower than the decomposition temperature of the niobium complex under normal pressure, the volatilization rate of the solvent is slow, resulting in poor productivity. Therefore, from the viewpoint of productivity, the drying of the raw material solution is preferably performed under a pressure equal to or lower than the saturated vapor pressure of water at the drying temperature for the raw material solution.

When the decomposition temperature of the niobium complex is lower than 100° C., water of crystallization may remain in the powder containing a niobium complex and lithium after drying, but the amount of water of crystallization can be measured by a coulometric titration method based on the Karl Fischer method. The amount of water of crystallization is permissible as long as it is 20 mass % or less.

The obtained dry powder may be pulverized. The pulverization method is not particularly limited, but pulverization can be performed using, for example, a mortar.

[Production Method of Lithium Secondary Battery Positive Electrode Active Material]

A lithium secondary battery positive electrode active material coated with lithium niobate can be produced by a step of dissolving a powder containing a niobium complex and lithium obtained by the production method of a powder containing a niobium complex and lithium of the invention in water, thereby obtaining a lithium niobate precursor solution, which is an aqueous solution containing the niobium complex and lithium, a step of coating a surface of a lithium secondary battery positive electrode active material with the aqueous solution, which is the precursor solution containing the niobium complex and lithium, and a step of subjecting the lithium secondary battery positive electrode active material coated with the aqueous solution containing the niobium complex and lithium to a heat treatment. As for specific production conditions, the methods described in PTLs 1 to 4 or a known method can be used.

EXAMPLES

[Qualitative Evaluation of Niobium Complex]

Whether the niobium complex is present in the powder was determined using a single reflection ATR method of Fourier transform infrared spectroscopy (FT-IR). Specifically, a dry powder sample obtained in Example was measured using an FT-IR apparatus NICOLET 6700 manufactured by Thermo Fisher Scientific, Inc. and a single reflection ATR accessory Smart OMNI-Sampler (germanium crystal, incident angle 45°) under the conditions of 16 scanning times and a resolution of 4. In addition, ion-exchanged water was used for background measurement.

With respect to the measured spectra, auto-baseline correction was performed using an analysis software (OMNIC Specta) attached to the FT-IR apparatus NICOLET 6700, and thereafter, auto-smoothing was performed once, and peak detection was performed at a sensitivity of 50. When a peak was observed at a wavenumber of 845 cm$^{-1}$±20 cm$^{-1}$, the measured powder was determined to contain a niobium complex.

[Measurement of Contents of Niobium and Lithium]

As for a sample in a powder state, for example, a dry powder sample obtained in Example, about 0.1 g of the dry powder sample was accurately weighed, and a small amount of pure water and 1 mL of 46 mass % hydrofluoric acid were added to the powder sample, and the resultant was dissolved by heating at about 140 to 170° C. on a hot plate. After cooling the solution to room temperature of about 20 to 30° C., the volume was adjusted using a volumetric flask, and after dilution as appropriate, an inductively coupled plasma atomic emission spectrometer (ICP-AES, CP-720 manufactured by Agilent Technologies, Inc.) was used to measure the concentrations of niobium and lithium in the diluted solution, and the contents of niobium and lithium in the dry powder sample were calculated.

In addition, as for a sample in a solution state, for example, a raw material solution, 0.1 g of a solution sample was taken, 15 mL of pure water and 5 mL of hydrochloric acid were added thereto, and thereafter, 2 mL of a hydrogen peroxide solution was added thereto, whereby a solution in which niobium and lithium were dissolved was obtained. Then, the operations after adjusting the volume were performed.

[Evaluation of Water Solubility]

The niobium dissolution ratio and the lithium dissolution ratio defined by the following formula (1) and formula (2) were calculated from the mass of niobium and lithium eluted into a filtrate obtained by filtering an aqueous solution in which a unit mass of the dry powder obtained in Example was dissolved in water at 25° C. ($Nb_w$ and $Li_w$ in the following formula (1) and formula (2)) and the mass of niobium and lithium contained in the dry powder obtained in Example ($Nb_{HF}$ and $Li_{HF}$ in the following formula (1) and formula (2)). Specifically, the niobium dissolution ratio and the lithium dissolution ratio were calculated by the following procedure.

<1> 1.0 g or 2.0 g of the dry powder sample obtained in Example was accurately weighed and dissolved in 8 times its mass of water (8.0 g or 16.0 g) at 25° C., and then, the resulting solution was filtered using a membrane filter (DISMIC-25HP manufactured by Toyo Roshi Kaisha, Ltd., opening: 0.20 µm).

<2> The concentrations of niobium and lithium in the filtrate obtained in the above <1> were measured by the measurement method for a sample in a solution state described above. From the measured values and the mass of the obtained filtrate, the mass of niobium and lithium eluted into the filtrate from a unit mass of the powder eluted into water at 25° C. ($Nb_w$ and $Li_w$ in the following formula (1) and formula (2)) was calculated.

<3> The mass of niobium and lithium contained in the dry powder sample obtained in Example was measured by the measurement method for a sample in a powder state described above. From the measured values and the mass of the weighed dry powder sample, the mass of niobium and lithium contained in a unit mass of the dry powder ($Nb_{HF}$ and $Li_{HF}$ in the following formula (1) and formula (2)) was calculated.

<4> From the numerical values of $Nb_w$, $Li_w$, $Nb_{HF}$, and $Li_{HF}$ obtained in the above <2> and <3>, the niobium dissolution ratio and the lithium dissolution ratio defined by the following formula (1) and formula (2) were calculated.

$$\text{Niobium dissolution ratio } (\%) = Nb_w \times 100/Nb_{HF} \qquad (1)$$

$$\text{Lithium dissolution ratio } (\%) = Li_w \times 100/Li_{HF} \qquad (2)$$

[Measurement of Contents of Carbon and Oxygen]

The concentration of carbon in the dry powder sample was measured using a trace carbon/sulfur analyzer (ETMA-U510 manufactured by Horiba Ltd.), and the concentration of oxygen therein was measured using an oxygen/nitrogen analyzer (EMGA-920 manufactured by Horiba Ltd.).

[Measurement of Amount of Ammonium Ions in Filtrate]

1.0 g or 2.0 g of the dry powder sample obtained in Example was accurately weighed and dissolved in 8 times its mass of water (8.0 g or 16.0 g) at 25° C., and then, the resulting solution was filtered using a membrane filter (DISMIC-25HP manufactured by Toyo Roshi Kaisha, Ltd., opening: 0.20 µm), and the amount of ammonium ions in the obtained filtrate was measured using an ion chromatograph (model ICS-300 manufactured by Dionex Corporation). In the measurement, IonPac CS14 (manufactured by Dionex Corporation) was used as a cation molecule column, and 10 mmol/L methasulfonic acid (manufactured by Dionex Corporation) was used as an eluent.

[Measurement of Absorbance of Filtrate]

1.0 g or 2.0 g of the dry powder sample obtained in Example was accurately weighed and dissolved in 8 times its mass of water (8.0 g or 16.0 g) at 25° C., and then, the resulting solution was filtered using a membrane filter (DISMIC-25HP manufactured by Toyo Roshi Kaisha, Ltd., opening: 0.20 µm), and the amount of insoluble fine particles that passed through the membrane filter and transferred to the filtrate among the sparingly soluble components in the obtained filtrate was qualitatively evaluated by measuring the absorbance at a wavelength of 660 nm using an ultraviolet-visible spectrophotometer (UV-1800 manufactured by Shimadzu Corporation). In the measurement, a quartz cell (10 mm×10 mm×45 mm) was used, and the measurement was performed at 25° C.

[Volume-Based Cumulative 50% Particle Diameter]

The volume-based cumulative 50% particle diameter (D50) of the dry powder sample was determined by measuring the volume-based particle size distribution at a dispersion pressure of 5 bar using a laser diffraction scattering particle size distribution analyzer (a HELOS particle size distribution analyzer (HELOS & RODOS (air flow type dispersion module)) manufactured by Sympatec GmbH).

[Amount of Moisture]

The amount of moisture in the dry powder sample was measured by a coulometric titration method using a Karl Fischer moisture meter (AQS-225010S manufactured by HIRANUMA Co., Ltd.). The moisture vaporization temperature was set to 100° C., and nitrogen gas was used as a carrier gas. Aqualyte RS-A (manufactured by HIRANUMA Co., Ltd.) was used as a generator electrolyte. In addition, Aqualyte CN (manufactured by HIRANUMA Co., Ltd.) was used as a counter electrolyte.

[X-Ray Diffractometry]

The dry powder sample was subjected to X-ray diffractometry under the following measurement conditions using an X-ray diffractometer (XRD-6100 manufactured by Shimadzu Corporation).

Tube: Cu
Tube voltage: 40 kV
Tube current: 30 mA
Divergence slit: 1.0°
Scattering slit: 1.0°
Light receiving slit: 0.3 mm
Scan speed: 2.0°/min
Step width: 0.02°

Example 1

In a 5 L beaker, 82.0 g of ion-exchanged water (resistivity: 17.2 MΩ·cm), 288.6 g of ammonia water with a concentration of 28 mass %, 1424.0 g of a hydrogen peroxide solution with a concentration of 35 mass %, 33.8 g of lithium hydroxide monohydrate (LiOH·$H_2$O), and 166.7 g of hydrous niobium oxide ($Nb_2O_5$·n$H_2$O, n=4.6, $Nb_2O_5$ content: 76.4 mass %) were placed and mechanically stirred at 60° C. for 10 hours. The resulting solution was filtered through a filter paper with an opening of 0.5 µm to obtain an aqueous solution containing a niobium complex and lithium, which was used as a raw material solution of lithium niobate. The concentrations of niobium and lithium in the obtained raw material solution of lithium niobate were 4.41 mass % and 0.38 mass %, respectively, and the Li/Nb molar ratio was 1.15.

Further, the concentration of ammonium ions in the raw material solution was measured and found to be 960 ppm. In addition, the absorbance of the precursor solution at a wavelength of 660 nm was measured and found to be 0.001.

Into a container, 114.2 g of the raw material solution prepared under the above conditions was dispensed, and the container was placed in a vacuum dryer and held for 12 hours under a gauge pressure of −0.1 MPa or less while maintaining the temperature at 25° C., thereby obtaining a dried product. Note that the gauge pressure is a differential pressure between the pressure inside the vacuum dryer and the atmospheric pressure. Subsequently, the dried product was pulverized in a mortar, thereby obtaining 9.9 g of a dry powder. When the volume-based particle size distribution of the dry powder after pulverization was measured with a laser diffraction particle size distribution analyzer, the cumulative 50% particle diameter $D_{50}$ was 140 μm.

When the dry powder after pulverization was subjected to X-ray diffractometry, a halo pattern was observed in a region of 2θ: 20° to 60°, and almost no peaks derived from a lithium niobate ($LiNbO_3$) crystal were observed. Therefore, it is found that the dry powder obtained in this Example is a powder made mainly of a material having an amorphous structure.

Further, 2.0 g of the dry powder was placed in a muffle furnace and subjected to a heat treatment in an air atmosphere at 600° C. for 2 hours, and then pulverized in a mortar, thereby obtaining 1.3 g of a fired powder. When the obtained fired powder was subjected to X-ray diffractometry, a peak derived from a lithium niobate ($LiNbO_3$) crystal was observed, and therefore, it was confirmed that the dry powder is a precursor of lithium niobate.

From the dry powder, 6.4 mg of a sample was taken, and a TG-DTA analysis was performed from 30° C. to 120° C. at a temperature increase rate of 10° C./min in an $N_2$ atmosphere with a flow rate of 200 mL/min. As a result, an endothermic peak presumed to be the decomposition temperature of the niobium complex was observed at 70° C., and therefore, the above drying temperature is lower than the decomposition temperature of the niobium complex. When the dry powder was measured by FT-IR, a peak at 845 $cm^{-1}±20$ $cm^{-1}$ attributed to the niobium complex was confirmed, and therefore, it could be confirmed that the dry powder contains the niobium complex. When the metal elements contained in an aqueous solution obtained by dissolving the dry powder in hydrofluoric acid were measured with an ICP-AES according to the above-mentioned [Measurement of Contents of Niobium and Lithium], the content of niobium and the content of lithium in the dry powder were 47.20 mass % and 3.47 mass %, respectively.

The Li/Nb molar ratio was 0.98. From the above measurement results, it could be confirmed that the dry powder is a powder containing a niobium complex and lithium, and that the proportion of niobium in the metal elements contained in the dry powder was 0.932 in terms of mass ratio. In addition, $Nb_{HF}$ and $Li_{HF}$ can be calculated from the content of niobium and the content of lithium in the dry powder. When $Nb_w$ and $Li_w$ were measured by measuring the metal elements contained in a filtrate obtained by dissolving the dry powder in water, followed by filtration using an ICP-AES, and the niobium dissolution ratio (%) and the lithium dissolution ratio (%) were calculated according to the above-mentioned [Evaluation of Water Solubility], 86.2% of Nb and 99.9% of Li were eluted into water.

Various measurement results for the dry powder obtained in this Example are shown in Table 1. When the dry powder obtained in this Example is dissolved in water again, an aqueous solution containing a niobium complex and lithium having almost the same composition as the precursor solution before solidification is obtained. Therefore, the powder containing a niobium complex and lithium obtained by the production method of the invention is a powder having a high solubility in water suitable for preparing a lithium niobate precursor solution for coating the surfaces of positive electrode active material particles of a lithium ion secondary battery with lithium niobate, which is a solid electrolyte. In addition, it is found that by storing the powder containing a niobium complex and lithium obtained by the production method of the invention, the problems of the storage stability of the aqueous solution containing the precursor of lithium niobate and the reduction in transport cost can be solved.

Comparative Example 1

Into a container, 505.7 g of an aqueous solution prepared under the same conditions as in Example 1 was dispensed, and subsequently, the container was placed in a tray type dryer and dried in the air for 12 hours while maintaining temperature at 120° C., thereby obtaining a dried product. Thereafter, the dried product was pulverized in a mortar, thereby obtaining 43.1 g of a dry powder. When the dry powder was measured by FT-IR, no peaks at 845 $cm^{-1}±20$ $cm^{-1}$ attributed to a niobium complex were observed, and therefore, it could be confirmed that the dry powder does not contain a niobium complex.

Various measurement results for the dry powder obtained in this Comparative Example are shown in Table 1. It is found that the dry powder of this Comparative Example, which does not contain a niobium complex, is inferior in water solubility to that of Example.

TABLE 1

| | Particle size distribution | Components of dry powder | | | | | | | | | |
| | | | | In metal elements | | Li/Nb | | | Nb + | | |
| | $D_{50}$ μm | Nb mass % | Li mass % | Proportion of Nb | Proportion of Nb + Li | molar ratio | O mass % | C mass % | Li + O mass % | moisture mass % | Nb complex |
| Example 1 | 140 | 47.20 | 3.47 | 0.932 | 1.000 | 0.98 | 41 | 0.13 | 91.67 | 5.80 | contain |
| Comparative Example 1 | 54 | 47.30 | 3.94 | 0.923 | 1.000 | 1.11 | 38 | 0.14 | 89.24 | 12.60 | not contain |

Components of aqueous solution obtained
by dissolving dry powder in 8 times its

TABLE 1-continued

| | Mass of Nb or Li in dry powder | | | mass of pure water at 25° C. | | | | | Content | | Mass of Nb or Li in aqueous solution | | | |
| | | | | pure | pure water/ powder | | | Li/Nb | of ammonium | absor- bance | | | Nb disso- | Li disso- |
| | powder g | Nb$_{HF}$ g | Li$_{HF}$ g | water g | mass ratio | Nb mass % | Li mass % | molar ratio | ions ppm | @660 nm | Nb$_w$ g | Li g | lution ratio % | lution ratio % |
|---|---|---|---|---|---|---|---|---|---|---|---|---|---|---|
| Example 1 | 2.0 | 0.95 | 0.07 | 16.0 | 8.0 | 4.53 | 0.39 | 1.14 | 1040 | 0.71 | 0.82 | 0.07 | 86 | 100 |
| Comparative Example 1 | 1.0 | 0.47 | 0.04 | 8.0 | 8.0 | 3.43 | 0.35 | 1.35 | lower limit or lower | 2.99 | 0.31 | 0.03 | 65 | 79 |

The invention claimed is:

1. A powder comprising a niobium complex and lithium, wherein the powder contains niobium in an amount of 25 mass % or more and 75 mass % or less, a proportion of niobium in metal elements contained in the powder is 0.775 or more and 0.950 or less in terms of mass ratio, and a niobium dissolution ratio of the powder containing a niobium complex and lithium defined by the following formula (1) is 80% or more:

$$\text{Niobium dissolution ratio (\%)} = Nb_w \times 100/Nb_{HF} \qquad (1)$$

wherein $Nb_w$ and $Nb_{HF}$ are a mass of niobium calculated by the following procedure:

the powder containing a niobium complex and lithium is weighed, and the weighed powder is dissolved in 8 times its mass of water at 25° C., and then, a resultant is filtered through a membrane filter with an opening of 0.20 μm, and a concentration of niobium in an obtained filtrate is measured with an inductively coupled plasma atomic emission spectrometer (ICP-AES), and a mass of niobium eluted into the filtrate from per unit mass of the weighed powder calculated from the concentration of niobium in the obtained filtrate and a mass of the filtrate is defined as $Nb_w$, and the powder containing a niobium complex and lithium is weighed, and to the weighed powder, hydrofluoric acid is added to dissolve the powder, and after cooling, a concentration of niobium in an obtained solution is measured with an inductively coupled plasma atomic emission spectrometer (ICP-AES), and a mass of niobium contained per unit mass of the weighed powder calculated from the concentration of niobium in the obtained solution and a volume of the solution is defined as $Nb_{HF}$.

2. The powder comprising a niobium complex and lithium according to claim 1, wherein the powder contains niobium in an amount of 40 mass % or more and 50 mass % or less.

3. The powder comprising a niobium complex and lithium according to claim 1, wherein the powder contains lithium in an amount of 2.5 mass % or more and 6.0 mass % or less, a total proportion of niobium and lithium in the metal elements contained in the powder is 0.80 or more and 1.00 or less in terms of mass ratio, and a Li/Nb molar ratio is 0.7 or more and 1.5 or less.

4. The powder comprising a niobium complex and lithium according to claim 1, wherein the powder contains lithium in an amount of 3.0 mass % or more and 4.5 mass % or less.

5. The powder comprising a niobium complex and lithium according to claim 1, wherein when the powder is dissolved in 8 times its mass of water at 25° C., a lithium dissolution ratio of the powder containing a niobium complex and lithium defined by the following formula (2) is 80% or more:

$$\text{Lithium dissolution ratio (\%)} = Li_w \times 100/Li_{HF} \qquad (2)$$

wherein $Li_w$ and $Li_{HF}$ are a mass of lithium calculated by the following procedure:

the powder containing a niobium complex and lithium is weighed, and the weighed powder is dissolved in 8 times its mass of water at 25° C., and then, a resultant is filtered through a membrane filter with an opening of 0.20 μm, and a concentration of lithium in an obtained filtrate is measured with an inductively coupled plasma atomic emission spectrometer (ICP-AES), and a mass of lithium eluted into the filtrate from per unit mass of the weighed powder calculated from the concentration of lithium in the obtained filtrate and a mass of the filtrate is defined as $Li_w$, and the powder containing a niobium complex and lithium is weighed, and to the weighed powder, hydrofluoric acid is added to dissolve the powder, and after cooling, a concentration of lithium in an obtained solution is measured with an inductively coupled plasma atomic emission spectrometer (ICP-AES), and a mass of lithium contained per unit mass of the weighed powder calculated from the concentration of lithium in the obtained solution and a volume of the solution is defined as $Li_{HF}$.

6. The powder comprising a niobium complex and lithium according to claim 1, wherein the powder contains oxygen, and a total content of niobium, lithium, and oxygen is 85 mass % or more.

7. The powder comprising a niobium complex and lithium according to claim 1, wherein a content of ammonium ions contained in a filtrate obtained by dissolving the powder in 8 times its mass of water at 25° C., and then, filtering a resultant through a membrane filter with an opening of 0.20 μm is 0.5 mass % or less.

8. The powder comprising a niobium complex and lithium according to claim 1, wherein an absorbance at a wavelength of 660 nm of a filtrate obtained by dissolving the powder in 8 times its mass of water at 25° C., and then, filtering a resultant through a membrane filter with an opening of 0.20 μm is 1.0 or less.

9. The powder comprising a niobium complex and lithium according to claim 1, wherein a volume-based cumulative 50% particle diameter $D_{50}$ is 1 mm or less.

10. A production method of a powder containing a niobium complex and lithium, comprising:

a step of mixing a niobium compound, a lithium compound, an alkali, hydrogen peroxide, and water, thereby obtaining an aqueous solution containing a niobium complex and lithium; and a step of drying the aqueous solution containing a niobium complex and lithium at a temperature equal to or lower than a decomposition temperature of the niobium complex.

11. The production method of a powder containing a niobium complex and lithium according to claim 10, wherein a pressure during drying of the aqueous solution is equal to or lower than a saturated vapor pressure of water at a drying temperature for the aqueous solution.

12. A production method of a lithium secondary battery positive electrode active material having a coating layer containing lithium niobate, comprising:

a step of dissolving a powder containing a niobium complex and lithium obtained by the production method according to claim 10 in water, thereby obtaining an aqueous solution containing the niobium complex and lithium;

a step of coating a surface of a lithium secondary battery positive electrode active material with the aqueous solution containing the niobium complex and lithium; and a step of subjecting the lithium secondary battery positive electrode active material coated with the aqueous solution containing the niobium complex and lithium to a heat treatment.

\* \* \* \* \*